United States Patent [19]

Kanaan et al.

[11] Patent Number: 5,577,743
[45] Date of Patent: Nov. 26, 1996

[54] QUICK RELEASE CHUCK DEVICE

[75] Inventors: Roger J. Kanaan, Easley; Edward H. Martin, Anderson, both of S.C.

[73] Assignee: Power Tool Holders, Inc., Wilmington, Del.

[21] Appl. No.: 438,880

[22] Filed: May 10, 1995

[51] Int. Cl.$^6$ .................................................. B23B 31/22
[52] U.S. Cl. ................. 279/72; 279/75; 279/81; 279/904
[58] Field of Search .................................. 279/22, 71, 72, 279/75, 81, 903, 904

[56] References Cited

U.S. PATENT DOCUMENTS

| | | |
|---|---|---|
| Re. 31,755 | 12/1984 | Wanner et al. . |
| 93,108 | 7/1869 | Miller . |
| 848,566 | 3/1907 | Nilsson ........................... 279/72 |
| 1,043,114 | 11/1912 | Kupke . |
| 1,353,299 | 9/1920 | Wilson . |
| 2,539,045 | 1/1951 | Waring ........................... 279/72 |
| 2,807,473 | 9/1957 | Kiehne . |
| 3,184,020 | 5/1965 | Benson et al. . |
| 3,489,191 | 1/1970 | Blevins ....................... 408/239 R |
| 3,536,335 | 10/1970 | Schmuck ......................... 279/81 |
| 3,811,361 | 5/1974 | Seely et al. ..................... 409/182 |
| 4,041,729 | 8/1977 | Bilz . |
| 4,231,581 | 11/1980 | Benedict ......................... 279/75 |
| 4,252,333 | 2/1981 | Vogel . |
| 4,275,893 | 6/1981 | Bilanceri . |
| 4,305,597 | 12/1981 | McCarty . |
| 4,692,073 | 9/1987 | Martindell . |
| 4,900,202 | 2/1990 | Wienhold . |
| 5,009,440 | 4/1991 | Manschitz . |
| 5,013,194 | 5/1991 | Wienhold . |
| 5,301,961 | 4/1994 | Wozar . |
| 5,354,075 | 10/1994 | Marik et al. . |
| 5,464,229 | 11/1995 | Salpaka ........................... 279/75 |

FOREIGN PATENT DOCUMENTS

| | | | |
|---|---|---|---|
| 708767 | 7/1931 | France | ........................... 279/72 |
| 29908 | 2/1915 | United Kingdom . | |

Primary Examiner—Steven C. Bishop
Attorney, Agent, or Firm—Dority & Manning

[57] ABSTRACT

A quick release chuck device includes a body member having an internal bore for receipt of a tool shank. The body member is matable to a drive spindle. A plurality of circumferentially spaced passages are defined in the body member, with each passage defining an opening into the internal bore. Bearing members are disposed in the passages and are radially movable within the passages so that at least a portion of each bearing member extends into the internal bore. An outer sleeve is disposed about the body member and the bearing members. The sleeve is rotatable relative to the body member between a gripping position and a released position. The outer sleeve has an inner diameter surface with ramping engaging surfaces defined therein which are spaced so as to engage the bearing members and force the bearing members radially inward to positively grip a tool shank disposed in the internal bore when the outer sleeve is rotated to its gripping position. The tool shank is released by rotating the outer sleeve to its released position which allows the bearing members to move radially outward.

14 Claims, 3 Drawing Sheets

QUICK RELEASE CHUCK DEVICE

BACKGROUND OF THE INVENTION

The present invention relates to a quick release chuck device utilized for holding power bits or tools to a rotating machine tool, and more particularly to a quick release chuck which is configured with a drive spindle and which contains a quick release radial and axial locking device.

Various devices are known in the art for use on portable stationary routers, laminate trimmers, dry wall cutters, and machine tools in general for securing or holding power tools or power bits to the spindle of the machine tool. For example, various collet tool holding devices and quick release adapters are known in the art. For example, U.S. Pat. No. 5,301,961 to Wozar describes such a chuck. Likewise, U.S. Pat. No. 4,692,073 to Martindell describes a chuck apparatus for power bits utilizing a spring-biased sleeve disposed about the drive spindle for axially securing the power bit to the chuck apparatus.

Any collet or chuck device utilized for holding a power bit, for example a router bit, to a drive spindle must lock the power bit both axially and radially with respect to the drive spindle. In other words, the power bit cannot rotate relative to the drive spindle nor be moved axially in and out relative thereto. This concern is especially important with high speed machine tools for both accuracy considerations and safety. With conventional systems, one relatively simple means for rotationally securing the tool bit consists of defining a hexagonal or other multi-sided profile on the end of the tool bit which fits into a corresponding multi-sided recess formed in the chuck device. With another solution, collet chucks utilize a compressible collet for axially and rotationally holding the tool bit. Collet chucks are useful in that they do not depend on a multi-sided configuration in the tool bit for holding the tool. Thus, any manner of power bits or tool bits having essentially round shank portions may be held by a collet chuck device. However, collet chuck devices do not have the quick change or quick release capabilities that are desired in many applications. For example, it is highly desirable for portable tools such as routers or laminent trimmers to utilize quick release chuck devices for relatively quick and easy changeout of tool bits. However, with the conventional quick release devices, the tool shank portions must be multi-sided to fit within corresponding bores defined in the quick change chuck devices. It would be desirable in the art to have a quick change chuck device which can be utilized with any manner of tool bit, including tool bits that have essentially round tool shanks, for increasing the versatility of such quick change chuck devices.

OBJECTS AND SUMMARY OF THE INVENTION

It is therefore a principle object of the present invention to provide a quick change chuck device for securing a tool bit or working device to the driven spindle of a machine tool.

A further object of the invention is to provide a versatile quick change chuck device which is capable of holding tool bits having round tool shanks.

And yet a further object of the present invention is to provide a fast acting quick change chuck device in which a tool bit can be readily inserted and removed without having to align a multi-sided profile of the tool with a multi-sided bore in the device.

Additional objects and advantages of the invention will be set forth in part in the description which follows, and in part will be obvious from the description, or may be learned by practice of the invention. The objects and advantages of the invention may be realized and attained by means of the instrumentalities and combinations particularly pointed out in the appended claims.

To achieve the objects and in accordance with the purposes of the invention, a quick change chuck device is provided having a body member with an internal bore defined therein for receipt of a tool shank. The body member further comprises a mechanism for mounting the body member onto a drive spindle. Alternatively, the body member may be formed as an integral part of the drive spindle. The device also includes a plurality of circumferentially spaced passages defined in the body member, with each passage defining an opening into the internal bore. Bearing members are disposed in the passages and are radially movable within the passages so that at least a portion of each bearing member extends into the internal bore through the openings in a gripping mode of the chuck device. An outer sleeve is disposed concentric about the body member and around the bearing members. The sleeve is rotatable relative to the body member and has an inner diameter surface with ramping bearing member engaging surfaces defined therein. The ramping engaging surfaces are circumferentially spaced to correspond to the circumferential spacing of the bearing members within the passages. The outer sleeve is rotatable between a gripping position and a released position of the chuck device wherein rotational movement of the outer sleeve to the gripping position causes the engaging surfaces to force the bearing members radially inward to positively grip a tool shank disposed in the internal bore. Rotational movement of the outer sleeve to the released position allows the bearings members to move radially outward thereby releasing a tool shank disposed in the internal bore.

In a preferred embodiment of the invention, the bearing members comprise longitudinal roller bearings and the circumferentially spaced passages comprise corresponding longitudinal channels defined in the body member. Preferably, the longitudinal channels taper radially inward so as to retain the roller bearings within the channels while still allowing at least a portion of the roller bearings to extend into the internal bore. In an alternative embodiment, the longitudinal channels may comprise a radial lip disposed so as to retain the roller bearings within the channel.

In still a further preferred embodiment, the bearing member engaging surfaces preferably comprise cam shaped surfaces. The cam shaped surfaces define a recess for the bearing members in the release position of the outer sleeve.

The present invention also preferably comprises a locking device which is operatively configured relative to the outer sleeve and the body member to releasably lock the outer sleeve in the gripping position. In one preferred embodiment, this locking device comprises a ball and detent device. The present inventive chuck device can be mated to the drive spindle of any manner of tool through various means. For example, in one preferred embodiment, the body member has a female threaded section defined therein for threaded engagement with a drive spindle. In an alternative embodiment, the body member may be integral with the drive spindle.

DETAILED DESCRIPTION OF THE PREFERRED EMBODIMENTS

Figure 1:
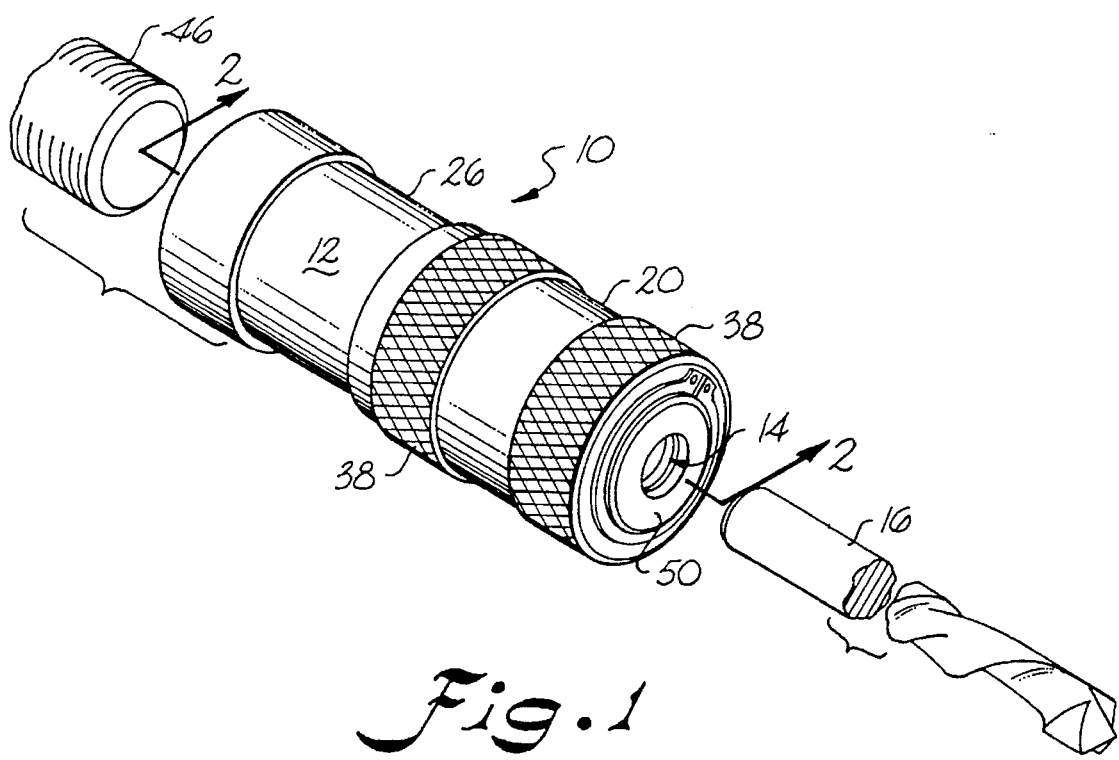
FIG. 1 is a perspective component view of the quick change chuck device according to the invention.

Reference will now be made in detail to the presently preferred embodiments of the invention, one or more examples of which are illustrated in the accompanying drawings. Each example is provided by way of explanation of the invention, not as a limitation of the invention. In fact, it will be apparent to those skilled in the art that various modifications and variations can be made in the present invention without departing from the scope or spirit of the invention. For instance, features illustrated or described as part of one embodiment can be used on another embodiment to yield a still further embodiment. Thus, it is intended that the present invention cover such modifications and variations as come within the scope of the appended claims and their equivalents. The numbering of components in the drawings is consistent throughout the application, with the same components having the same number in each of the drawings.

A preferred embodiment of the present invention is illustrated in FIGS. 1 through 4 and is depicted as chuck device 10. Device 10 includes a body member 12 having an internal bore 14 defined therein. Bore 14 has a diameter sized to accommodate a tool shank 16 inserted therein. Bore 14 is not necessarily defined completely through body member 12 but has a length sufficient for accepting the round axial portion of tool shank 16. An O-ring 52, or similar device, may also be seated in body member 12 to aid in keeping the tool bit aligned within bore 14. O-ring 52 also serves to keep dust and contaminates from entering bore 14 and possibly fouling operation of the device.

Figure 2:
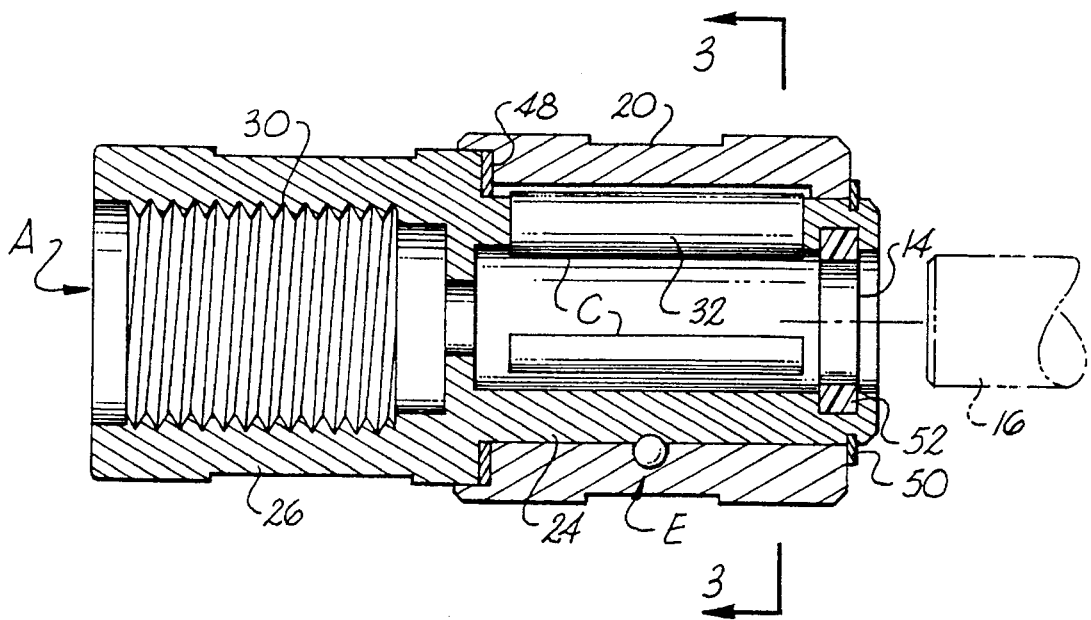
FIG. 2 is a cut-away side view of the chuck device illustrated in FIG. 1.

In a preferred embodiment illustrated particularly in FIG. 2, body member 12 may have a front portion 24 and a back portion 26. Bore 14 is defined in front portion 24. Back portion 26 is matable with a drive spindle 46, as will be discussed.

Figure 4:
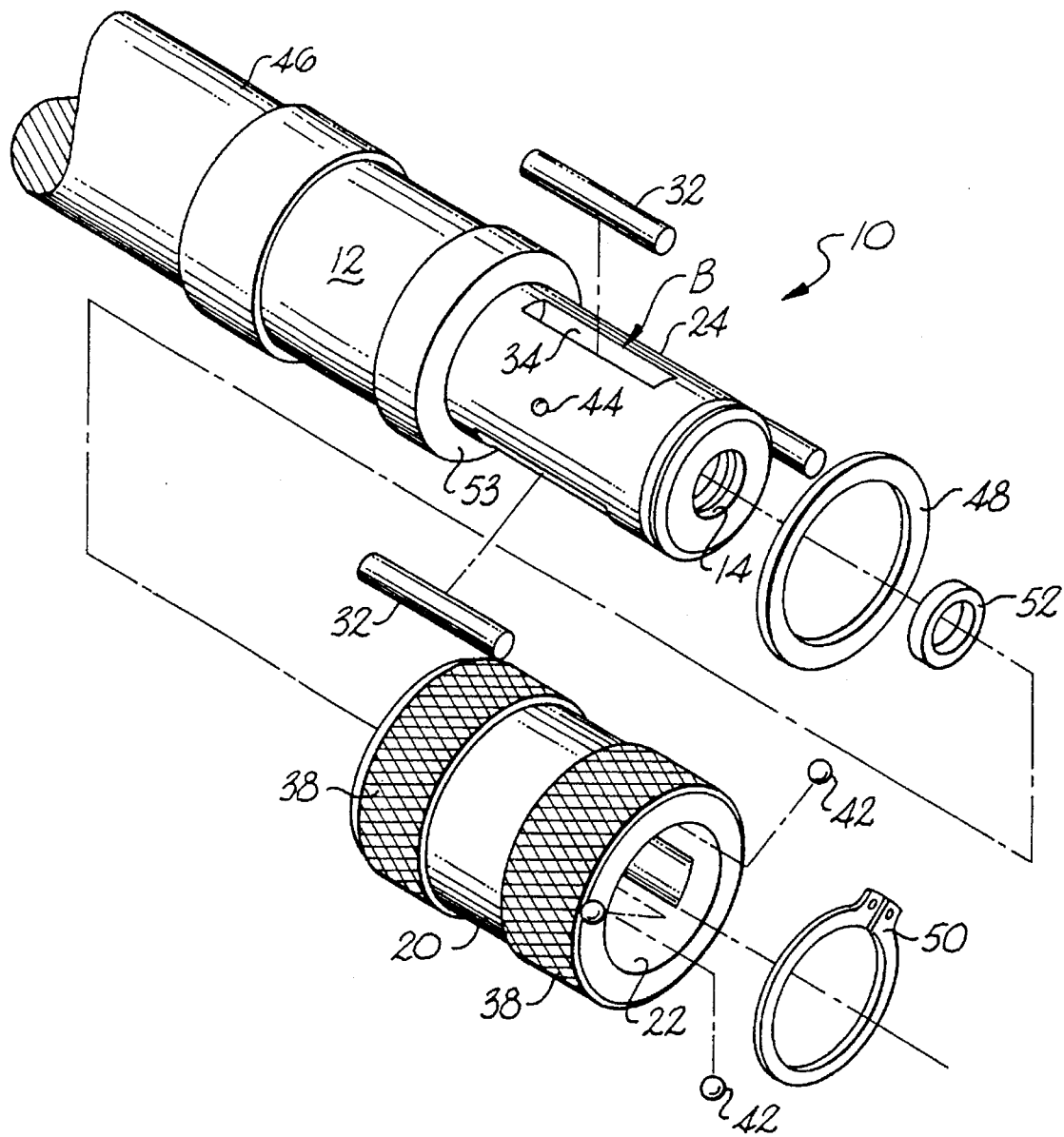
FIG. 4 is an in-line component view of the quick change chuck device according to the invention.

Device 10 also includes a plurality of circumferentially spaced passages B defined in body member 12, as shown particularly in FIG. 4. Each passage defines an opening 18 into internal bore 14. In a preferred embodiment illustrated in the figures, passages B comprise longitudinal channels 34. In an alternative embodiment not illustrated, passages B may comprise round or cylindrical passages depending on the type of bearing members utilized, as discussed below.

Figure 3:
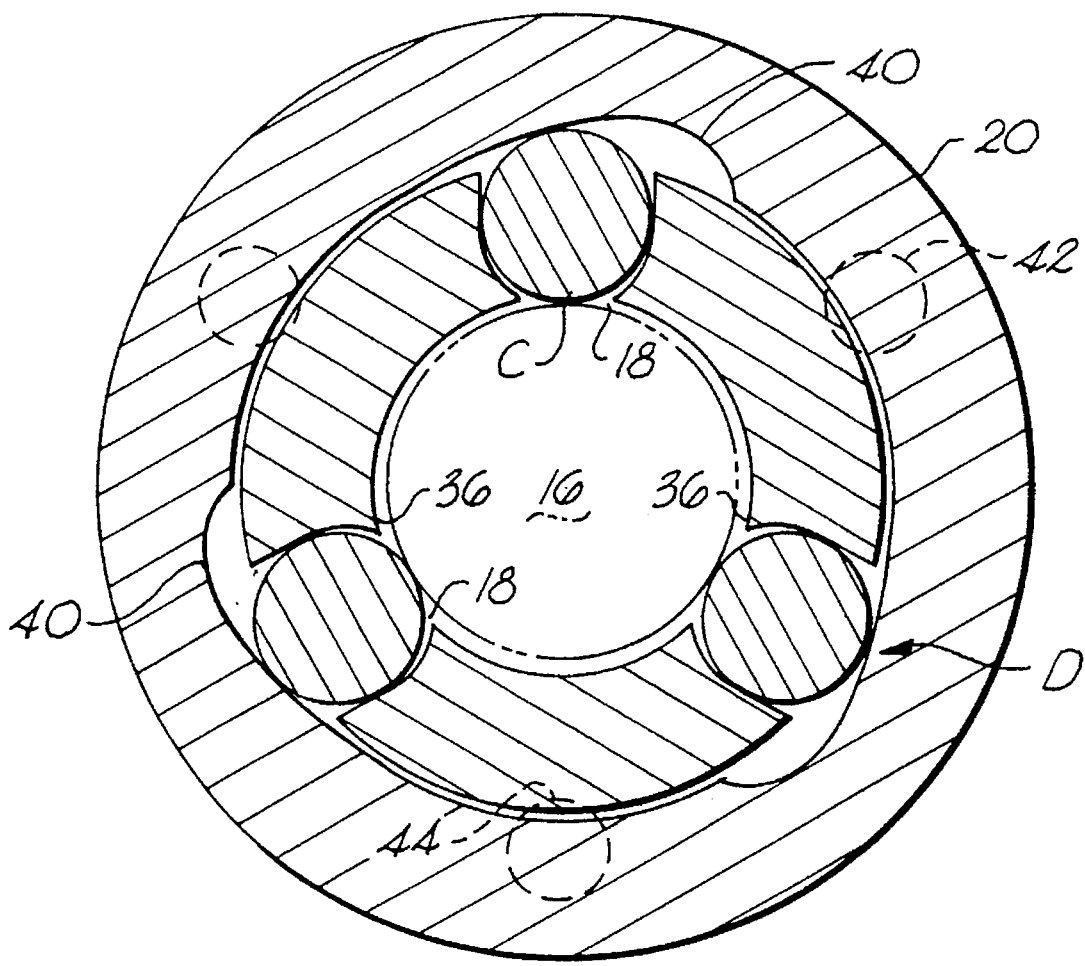
FIG. 3 is a cut-away view of the device shown in FIG. 2 taken along the lines indicated.

Device 10 also includes bearing members, generally C, disposed in passages B. In a preferred embodiment illustrated, bearing members C comprise longitudinal roller bearings 32. In an alternative embodiment, bearing members C may comprise, for example, ball bearings. Bearing members C reside within passages B and are radially movable within the passages so that at least a portion of each bearing member extends into internal bore 14 through openings 18 in passages B in a gripping mode of chuck device 10, as particularly illustrated in FIG. 3. In this regard, passages B are tapered radially inward or may comprise a radial lip 36 as illustrated in FIG. 3 to retain bearing members C within passages B once the tool shank 16 is removed from the device.

Device 10 also includes an outer sleeve 20 which is disposed concentric about body member 12 and around bearing members C. Preferably, outer sleeve 20 is disposed around front portion 24 of body member 12, as illustrated particularly in FIGS. 1 and 2. Outer sleeve 20 is rotatable relative to body member 12 between at least a gripping position and a released position, as discussed more fully below. Outer sleeve 20 has an inner diameter surface 22 with ramping bearing member engaging surfaces, generally D, defined therein. Ramping surfaces D are circumferentially spaced to essentially match the circumferential spacing of openings B and bearing members C. In a preferred embodiment of the invention, ramping surfaces D comprise cam shaped surfaces 40, as particularly illustrated in FIG. 3. Ramping surfaces D, or cam surfaces 40, generally extend in a longitudinal direction, at least as long as bearing members C. It should be understood that ramping surfaces D can be defined in either circumferential direction.

Preferably, outer sleeve 20 also comprises a grip enhancing surface 38 defined on the outer circumference thereof to enable an operator to positively grip the outer sleeve and rotate the sleeve relative to the body member. In an alternative embodiment, outer sleeve 20 may be coated with a grip enhancing material, such as a rubber or plastic composition.

Device 10 also preferably includes a locking mechanism, generally E, to rotationally lock outer sleeve 20 in at least its gripping position. Locking mechanism E may comprise any manner of conventional locking device. In the embodiment illustrated, locking device E comprises a ball 42 and detent 44 combination as particularly illustrated in FIGS. 2 through 4. The ball and detent device may be disposed along the sleeve section as shown in the figures, or between the sleeve and shoulder 53.

Device 10 also includes a mounting mechanism, generally A, for mating device 10 with a drive spindle 46. In a preferred embodiment, particularly illustrated in FIGS. 1 and 2, mechanism A comprises a female threaded section 30 for threaded engagement with drive spindle 46. It should be understood, that any manner of conventional mating systems or devices may be utilized in this regard. In an alternative preferred embodiment illustrated particularly in FIG. 4, body member 12 may be configured or formed integral with drive spindle 46. For example, body member 12 may actually be formed onto the end of drive spindle 46.

Device 10 also preferably includes a snap ring 50, or other retaining device, to maintain outer sleeve 20 attached to body member 14. Additionally, a ring seal 48 is also disposed between shoulder 53 of body member 12 and the rearward surface of outer sleeve 20.

In operation, an operator inserts a tool shank 16 into internal bore 14 of device 10. Outer sleeve 20 is rotated to a released position which allows bearing members C to move radially within passages B. For example, in the embodiment wherein cam surfaces 40 are utilized, outer sleeve 20 is rotated so that the recessed portion of cam surfaces 40 are opposite bearing members C. Thus, bearing members C are free to move radially outward thereby allowing tool shank 16 to be inserted into bore 14.

Once tool shank 16 is inserted into the bore, the operator will grasp outer sleeve 20 and rotate sleeve 20 to its gripping position. In the embodiment of FIG. 3, outer sleeve 20 would be rotated clockwise. In this manner, the ramping surfaces D or cam surfaces 40 will engage bearing members C and force bearing members C radially inward to engage and lock against tool shank 16. Thus, it should be understood, that the bearing members are circumferentially spaced so as to keep tool shank 16 centered within bore 14. With the preferred embodiment, outer sleeve 20 is rotated until the ball and detent locking mechanism engage thereby locking sleeve 20 in its gripping position. The device will also operate without the locking mechanism whereby outer sleeve 20 is maintained in its gripping position by frictional forces alone.

The tapered contours of openings B, or radial lips 36, allow only a portion of bearing members C to extend into internal bore 14 once sleeve 20 is rotated to its gripping position. Thus, the degree or portion of the bearing members C which extend into bore 14 define the minimum capacity of device 10. The maximum capacity of device 10 is defined essentially as the inner diameter of body member 12. Thus, it should be understood, that device 10 is capable of gripping tool shanks of varying diameter depending on the radial movement of bearing members C.

To release the tool shank 16, the operator rotates outer sleeve 20 in the opposite direction, for example counterclockwise in FIG. 3, allowing bearing members C to move radially outward into the recess portions of ramp surfaces 40. Tool shank 16 is then simply removed from bore 14.

The present invention is suited for any manner of machine tool wherein a tool bit must be rotationally driven. The device is particularly suited for a machine router. However, this is no means a limitation of the invention. In fact, it will be apparent to those skilled in the art that various modifications and variations can be made in the apparatus of the present invention without departing from the scope or spirit of the invention. Thus, it is intended that the present invention cover such modifications and variations of this invention provided they come within the scope of the appended claims and their equivalents.

What is claimed is:

1. A quick release chuck device, comprising:

a body member having an internal bore defined therein for receipt of a tool shank, said body member further comprising a mechanism for mounting said body member onto a drive spindle;

a plurality of circumferentially spaced passages defined in said body member, each said passage defining an opening into said internal bore;

bearing members disposed in said passages, said bearing members being radially movable within said passages so that at least a portion of each said bearing member extends into said internal bore through said openings in a gripping mode of said chuck device; and an outer sleeve disposed concentric about said body member around said bearing members, said sleeve being rotatably limited and rotatably non-biased relative to said body member, said outer sleeve having an inner diameter surface with spaced apart ramping bearing member engaging surfaces defined therein and circumferentially spaced to correspond to the circumferential spacing of said bearing members within said passages, said bearing members contacting said inner diameter surface along said engaging surfaces, said outer sleeve being rotatable between a gripping position and a released position of said chuck device defined by the circumferential length of said engaging surfaces wherein rotational movement of said outer sleeve to said gripping position causes said engaging surfaces to force said bearing members radially inward to positively grip a tool shank disposed in said internal bore at any position on the circumference of the tool shank, and rotational movement of said outer sleeve to said released position allows said bearing members to move radially outward thereby releasing a tool shank disposed in said internal bore.

2. The chuck device as in claim 1, wherein said body member comprises a generally cylindrical front portion having said internal bore defined therein and a back portion axially aligned with said front portion with a female threaded section for threaded engagement with a driving spindle.

3. The chuck device as in claim 1, wherein said bearing members comprise longitudinal roller bearings and said circumferentially spaced passages comprise corresponding longitudinal channels defined in said body member.

4. The chuck device as in claim 3, wherein said longitudinal channels taper radially inward.

5. The chuck device as in claim 3, wherein said longitudinal channels comprise a radial lip to retain said roller bearings within said channel.

6. The chuck device as in claim 1, wherein said outer sleeve further comprises a grip enhancing surface defined on at least a portion of its outer circumferential surface.

7. The chuck device as in claim 1, wherein said bearing member engaging surfaces comprise cam shaped surfaces, said cam shaped surfaces defining a recess for said bearing members in said released position of said outer sleeve.

8. The chuck device as in claim 1, further comprising a locking device operatively configured relative to said outer sleeve and said body member to releasably lock said outer sleeve in said gripping position.

9. The chuck device as in claim 8, wherein said locking device comprises a ball and detente device.

10. A quick release chuck device, comprising:

a body member having an internal bore defined therein for receipt of a tool shank;

a plurality of circumferentially spaced longitudinal channels defined in said body member, each said channel defining an opening into said internal bore;

longitudinal roller bearings disposed in said channels, said roller bearings being radially movable within said channels so that at least a portion of each said roller bearing extends into said internal bore through said openings in a gripping mode of said chuck device;

a non-rotationally biased outer sleeve disposed concentric about said body member around said longitudinal roller bearing, said outer sleeve being rotatably limited relative to said body member between a gripping position and a released position, said outer sleeve having an inner diameter with spaced apart cam surfaces defined therein and circumferentially spaced to correspond to the circumferential spacing of said longitudinal roller bearings within said channels, said longitudinal roller bearings contacting said outer sleeve along said cam surfaces, said cam surfaces defining the degree of rotation of said outer sleeve relative to said body member wherein rotational movement of said outer sleeve to said gripping position causes said cam surfaces to force said longitudinal roller bearings radially inward to positively grip a tool shank disposed in said internal bore, and rotational movement of said outer sleeve to said released position allows said longitudinal bearing members to move radially outward thereby releasing a tool shank disposed in said internal bore; and a releasable locking mechanism operatively configured relative to said outer sleeve and said body member at a circumferential position between said cam surfaces to lock said outer sleeve in said gripping position.

11. The chuck device as in claim 10, wherein said device is configured on the end of a drive spindle.

12. The chuck device as in claim 11, wherein said body member is formed integral with said drive spindle.

13. The chuck device as in claim 10, wherein said body member comprises a mating mechanism for mating said body member to a drive spindle.

14. The chuck device as in claim 13, wherein said mating mechanism comprises a threaded portion defined in said body member for threaded engagement with a drive spindle.

* * * * *